United States Patent [19]
Walker et al.

[11] 3,818,198
[45] June 18, 1974

[54] AUTOMATIC DIRECT-READING PHOTOMETER APPARATUS AND METHOD

[75] Inventors: Richard A. Walker, Woodland Hills; Robert W. Maloy, Downey, both of Calif.

[73] Assignee: Kollmorgen Corporation, Holyoke, Mass.

[22] Filed: Aug. 31, 1972

[21] Appl. No.: 285,239

[52] U.S. Cl............... 235/151.3, 356/213, 356/233
[51] Int. Cl........................... G06f 15/20, G01j 1/00
[58] Field of Search ......... 235/151.3; 356/233, 213, 356/218, 226, 234, 235

[56] References Cited
UNITED STATES PATENTS

| | | | |
|---|---|---|---|
| 3,377,467 | 4/1968 | Staunton et al..................... | 356/213 |
| 3,531,208 | 9/1970 | Ward.............................. | 235/151.3 |

OTHER PUBLICATIONS

Gorcum et al., "Automatic Photometer with Digital Recording For Checking Quality of Incandescent Lamps," Control, Apr. 1967, May, 1967 pp. 158–162 & 236–240 respectively.

D'Agostino, "Photometric Calibration of Automatic Exposure Control Systems," Technical Report Ecom-2748, Aug. 1966.

*Primary Examiner*—Felix D. Gruber
*Assistant Examiner*—Errol A. Krass
*Attorney, Agent, or Firm*—Edward F. Jaros

[57] ABSTRACT

A photometer system of the type having a photoelectric sensor receiving light through selectable different-sized apertures and selectable different density optical filters is provided with electronic circuitry including a numerical read-out means for automatically compensating the photo-sensor output in accordance with selected aperture and filter settings and for providing a direct numerical reading of the measured light. The circuitry automatically calculates the proper scale or multiplier of the direct reading, again in accordance with the selected apertures and filters, and provides a numerical display of such scale multiplier. Additionally, a gain control for changing the sensitivity of the photoelectric sensor is provided with an output indicative of the gain setting. This gain setting information is electronically fed to the computer along with the aperture and filter information for automatically computing and displaying the correct scale or multiplier factor from all of these independent variables.

11 Claims, 1 Drawing Figure

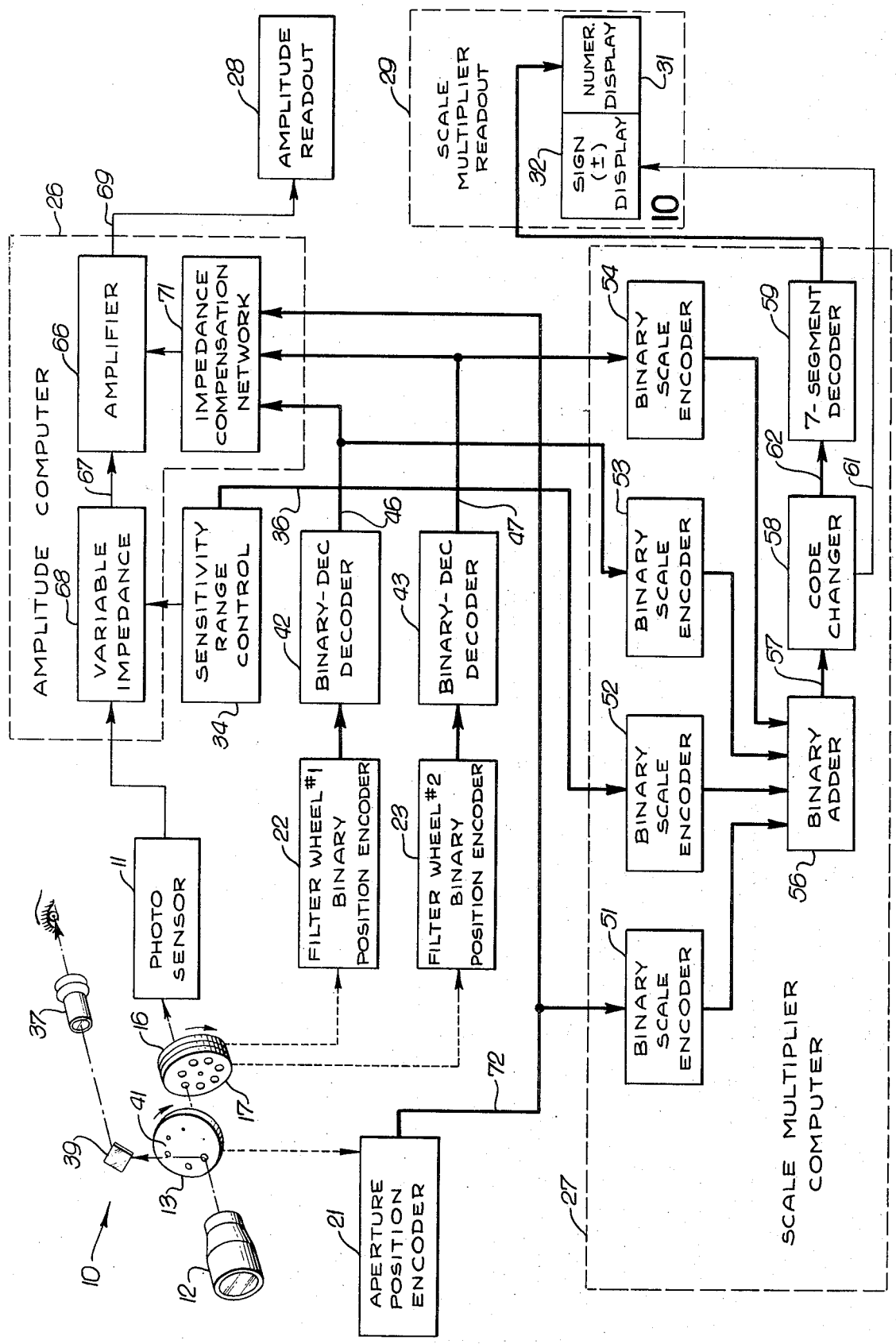

AUTOMATIC DIRECT-READING PHOTOMETER APPARATUS AND METHOD

BACKGROUND OF THE INVENTION

The present invention relates in general to photometry, radiometry and illumination engineering, and more particularly to instrumentation for facilitating the measurement of light parameters such as luminance, illuminance, candlepower, color temperature, radiance, irradiance and radiant intensity.

The present invention is particularly directed to light measuring instruments or photometers capable of high sensitivity, precision, and versatility such as required for diverse scientific and engineering applications. Typical uses of these precision and highly versatile instruments are night vision studies, airport lighting surveys, cathode ray tube luminance measurements, and aircraft panel luminance measurements. It will be appreciated that light measurements in these diverse environments require a photometer having many different light measuring modes. In particular, the most versatile of photometers will have a variable measuring field aperture to permit measurement of light in defined areas or sports, the scope of the area being adjustable by changing the aperture setting. Also the instrument will have a variety of optical filters, including neutral density filters and colorimetry filters. The neutral density filters afford control over the sensitivity of the photoelectric pickup independent of the light wavelength, while the colorimetry filters are of course wavelength selective. A gain or range control may also be provided such that an operator can increase the sensitivity of the photoelectric sensor to permit effective light measurements of dim or weak sources of light or at low light levels.

All of these variables affect the luminance reading or output developed by the photometer. This affect is twofold. First, the various aperture and filter settings are not capable of being precisely dimensioned and designed to provide a predictable unit change in the output reading of the photometer for each of the various settings. This requires calibration of the aperture and filter settings in order to conform the measured reading of the photometer to a standard or predicted reading determined by a light standard of known brightness or luminance. The second aspect concerns the change in scale or sensitivity of the photometer output reading, depending upon the selected aperture, filter, and gain. Each of these independent variables have an effect on the photometer output scale or range and the composite effect of the aperture, filter, and gain settings must be considered in determining the magnitude of the photometer reading.

In most photometer instruments, in order to compute the correct reading, the operator must take into account a separate multiplier factor for each of the independent variables because of the above-mentioned scale or range effect. One prior attempt to alleviate this complexity in use of sophisticated photometers has provided an electro-mechanical mechanism by which the several independent variables or dials on the instrument may be locked together in a particular fashion so that when the electrical gain or sensitivity switch is changed, the remaining variables are likewise switched. While to a certain extent this mechanism does take into account the scale effect of the independent variables, it is undesirably complex to build and operate and moreover requires re-setting of the ganged switching mechanism when either the neutral density filter or field aperture is changed. Furtherstill, this prior device only indicates the correct scalefactor and still requires multiplication of the several calibration numbers to arrive at the exact value of luminance or other measured parameter.

SUMMARY OF THE INVENTION AND ITS OBJECTIVES

Accordingly, it is an object of the present invention to provide a photometry method and apparatus by which an automatic, direct-reading numerical indication of the measured light parameter, automatically taking into account the variables associated with the light sensor such as measuring field aperture setting, filter setting and range or sensitivity setting.

It is another object of the present invention to provide an electronic computation circuit for calculating the correct scale multiplier for a photometer instrument having built-in variable measuring field apertures and variable optical filters.

It is still another object of the present invention to provide such a computation circuit which in addition to calculating the scale factor or multiplier in accordance with the aperture and filter settings, also automatically compensates for photo-optical anomalies associated with the individual aperture and filter settings. It is noted in this respect, that variations in the relative transmittance of the aperture or filter setting are inevitable, and thus these variations or errors must be compensated for and as indicated it is one of the objects of the present invention to automatically provide such compensation.

It is a further object of the present invention to provide a combined analog and digital electronic circuit for effecting most efficiently the automatic compensation for the various aperture and filter settings and for automatically calculating the proper scale factor, also in accordance with these settings.

Another object of the present invention is to provide an electronic circuit as above capable of accommodating factory adjustable compensating elements to permit factory calibration of the automatic compensating circuitry for the aperture and filter settings.

In general these objects are achieved in accordance with the present invention by a photometer instrument of the type having variable aperture and filter settings cooperating with electronic circuitry including numerical readout means for electronically responding to aperture and filter wheel setting information and automatically compensating the photo-sensor output in response thereto. Simultaneously the circuit automatically calculates the proper scale multiplier for the chosen settings. Additionally, a range or sensitivity control is provided for directly changing the sensitivity of the photoelectric output, wherein the setting of this control is fed to the circuitry along with the aperture and filter setting information to include in the computed scale multiplier the selected sensitivity factor.

These and further objects and various advantages of the direct-reading photometer apparatus and method according to the present invention will become apparent to those skilled in the art from a consideration of the following detailed description of an exemplary embodiment thereof.

BRIEF DESCRIPTION OF THE DRAWING

Reference will be made to the appended drawing showing a composite mechanical-electrical diagram of the photometer instrument constructed and operating in accordance with the present invention.

DESCRIPTION OF THE PREFERRED EMBODIMENT

With reference to the drawing, the automatic direct reading photometer apparatus and method of the present invention generally comprises an electro-optical head 10 of the type including a photo-sensor 11, such as provided by a conventional photo multiplier tube, an objective lens 12 arranged to receive and direct light to sensor 11, a measuring field aperture wheel 13, and a pair of filter wheels 16 and 17 all arranged in the optical path between lens 12 and sensor 11 to provide means for controlling the amount of light reaching the sensor. Each of wheels 13, 16 and 17 are constructed to provide a plurality of settings, each setting having means providing a predictable light controlling effect on the amount of light reaching sensor 11.

Cooperating in combination with head 10 is circuitry including aperture position encoder 21, and a pair of filter wheel binary position encoders 22 and 23, providing means for encoding the instantaneous position of each wheels 13, 16 and 17. The encoding results in electrical position signals representative of the aperture and filter settings. The outputs of encoders 22 and 23 (through decoders 42 and 43) and the output of encoder 21 are jointly fed to an amplitude computer 26 and a scale multiplier computer 27 which together function to provide means for developing an automatically compensated light measurement signal in response to an output signal from sensor 11. This light measurement signal is registered by a numerical readout means provided in part by an amplitude readout 28 responsive to amplitude computer 26 displaying a continuously variable amplitude readout proportional to the output of sensor 11. The other part of the readout means is provided by a scale multiplier readout 29, which is here in the form of a numerical display 31 and a sign display 32 responsive to an output of scale multiplier computer 27 to indicate the proper scale factor or multiplier in accordance with the aperture and filter wheel position signals. Thus the scale readout developed by displays 31 and 32 indicate the factor by which the amplitude displayed on readout 28 is to be multiplied by to register the complete and scaled light measurement signal.

As a further important feature of the present invention a variable sensitivity range control 34 is included within the circuitry and connected to amplitude computer 26 so as to obtain a variable gain in the amplitude signal displayed on readout 28 in response to the output of sensor 11. Moreover, control 34 is equipped with a position encoded output 36 for developing an electrical position signal representative of the instantaneous setting of control 34. Output 36 is informatively connected to scale multiplier computer 27 in a manner similar to the outputs of encoders 22 and 23 (through decoders 42 and 43) and that of encoder 21 so as to develop a resultant scale multiplier signal applied to readout 29 jointly in response to the aperture, filter and sensitivity position information.

In general devices providing the function of electro-optical head 10 are known and accordingly this device per se, does not constitute a novel aspect of the present invention. An example of the optical system of such a prior device is known as the "Pritchard Photometer" made by the assignee of this application. This photometer includes an objective lens 12 for transmitting light to an inclined apertured mirror 41, the light being measured passing through the aperture, through light modifying means, and then falls upon the light sensor. At the apertured mirror, light is diverted and reflected at 39 along a viewing path to an eyepiece 37 for viewing the scene and particularly for visually defining the spot or area thereof from which the light is to be measured.

Similarly, instrumentation circuitry operating in conjunction with an output signal from an electro-optical head photo-sensor, such as sensor 11 to provide a gain or sensitivity range control, such as control 34, is conventional per se.

However, in accordance with the present invention, electro-optical head 10 and sensitivity range control 34 are arranged in a combination in which the aperture, filter and sensitivity settings are automatically, electronically accounted for in a direct-reading numerical output of the measured light. Not only is the amplitude of the output signal of sensor 11 automatically compensated depending on the settings of the aperture and filter wheels, but also the scale effect of the independent variables, namely the aperture, filter and sensitivity settings, is automatically computed and displayed at scale multiplier readout 29.

Considering the construction and operation of the direct-reading photometer in greater detail, each of encoders 22 and 23 are here provided by a three bit binary position encoder in which a possibility of eight different positions or settings of wheels 16 and 17 may be represented. Encoder 21 which may be provided by a multi-position rotary switch develops a straight decimal position signal representing five aperture positions corresponding to settings of wheel 13 for 2', 6', 20', 1° and 3°.

Encoders 22 and 23 each provide a three bit position encoding signal representing seven settings for each of filter wheels 16 and 17. Here wheel 16 is a neutral density filter turret providing neutral density filter settings, numbers 0 through 6. Filter wheel 17 is provided with seven possible settings and carries various colorimetry filters, polarizing filters and if desired a built in light calibrating source. By virtue of the binary format of encoders 22 and 23, an efficient means is provided for developing a unique position signal for each of the filter wheel settings. The outputs of encoders 22 and 23 are decoded in binary to decimal decoders 42 and 43 such that outputs 46 and 47 from each carry a set seven decimal signal positions representing the seven positions of filter wheels 16 and 17 respectively.

The various outputs from encoder 21, sensitivity control 34, and decoders 42 and 43 are fed to separate binary scale encoders 51, 52, 53 and 54 of scale multiplier computer 27 as indicated. These scale encoders are responsive to the aperture, filter and sensitivity position signals to develop at the output thereof a binary signal representing the power to which 10 is to be raised to indicate the scale multiplier contribution of the associated parameter. For example, adjusting wheel 13 to a smaller aperture decreases the amount of light reaching photosensor 11 causing a commensurate reduction in the output signal therefrom. This signal reduction results in a decrease in the amplitude displayed on readout 28 as it is proportional to the output of sensor 11. Simultaneously with the decrease on the amplitude readout, the scale multiplier readout appearing at displays 31 and 32 increases, for example by factor of 100, to show that the overall reading of the measured light at which head 10 is directed is the same. This change in the scale multiplier readout responsive to aperture wheel 13 is provided by encoder 51 as a binary signal representing the power of 10, in this instance 2, indicating the change. Similar scale contributions are developed by encoders 52, 53 and 54 in response to the sensitivity setting on control 34, neutral density filter setting on wheel 16 and the color or polarizing filter setting of wheel 17.

A binary adder 56 is connected to the outputs of encoders 51–54 to provide a means for summing the outputs therefrom to total the scale multiplier contributions of the various aperture, filter and sensitivity settings. A binary signal thus appears at output 57 of adder 56 representing the total power of 10 in binary form resulting from these contributions. A decoding means, here in the form of code changer 58 and a seven segment decoder 59, serves to transform the binary signal at output 57 into a set of signals appropriate for activating numerical display 31 and a sign display 32. As indicated in the tables set forth herein, readout 29 in the form of displays 31 and 32, indicates a power of 10 scale multiplier by which the amplitude registered on the readout 28 is to be multiplied.

With reference to the following table, the relationship between the aperture setting on wheel 13 and the output of binary scale encoder 51 is set forth.

APERTURE CONTRIBUTION TABLE

| Aperture Setting | Scale Factor | Binary Scale Contribution |
|---|---|---|
|  |  | (Binary) |
| 2' | $10^0$ | 0 |
| 6' | $10^1$ | 1 |
| 20' | $10^2$ | 2 |
| 1° | $10^3$ | 3 |
| 3° | $10^4$ | 4 |

It will be observed that increasing aperture openings correspond to an increase scale factor and an increase in the binary scale contribution signal developed by encoder 51. While the binary scale contribution is indicated by number 0 through 4 in the table, the output of encoder 51 will of course be in a binary signal format.

Similarly, the following gain or sensitivity settings of control 34 are correlated to the scale factors and binary scale contributions associated with encoder 52.

SENSITIVITY OR GAIN CONTRIBUTION TABLE

| Sensitivity Range | Scale Factor | Binary Scale Contribution |
|---|---|---|
|  |  | (Binary) |
| 1 | $10^0$ | 0 |
| 10 | $10^1$ | 1 |
| 100 | $10^2$ | 2 |
| 1000 | $10^3$ | 3 |

Thus, sensitivity range control 34 is here provided with four settings, although any number of settings may be employed, in which increasing sensitivity results in an increase in the amplitude displayed by readout 28 for the same electrical output signal from photo-sensor 11. The output of binary scale encoder 52 issues a binary signal representing 0, 1, 2 or 3 depending upon the setting of control 34, where this signal corresponds to the power of 10 of the associated range setting.

For encoder 53, which is associated with filter wheel 16 or the neutral density filter wheel, the following table is set forth.

NEUTRAL DENSITY FILTER CONTRIBUTION TABLE

| Neutral Density Filter Setting | Scale Factor | Binary Scale Contribution |
|---|---|---|
|  |  | (Binary) |
| No. 0 (100% transmission) | $10^0$ | 0 |
| No. 1 (10% transmission) | $10^1$ | 1 |
| No. 2 (1% transmission) | $10^2$ | 2 |
| No. 3 (0.1% transmission) | $10^3$ | 3 |
| No. 4 (0.01% transmission) | $10^4$ | 4 |
| No. 5 (0.001% transmission) | $10^5$ | 5 |
| No. 6 (0.0001% transmission) | $10^6$ | 6 |

As indicated a series of seven neutral density filter settings are provided including an open position, indicated as numbers 0 through 6 of filter positions. The open position of course has 100 percent light transmission while the remaining positions provide decreasing percentage transmissions in steps of a factor of 10, with the greatest attenuation corresponding to setting number 6. As increasingly dense filters on wheel 16 are used, the scale factor for the readout of the light intensity increases as indicated and thus the binary scale multiplier contribution issued by encoder 53 similarly increases. Thus for the open position for 100 percent transmission, a scale factor of $10^0$, corresponds to a contribution by encoder 53 of a binary zero, whereas an extremely dense filter setting, number 6 for example, provides a contribution of a binary 6. This increasing scale multiplier contribution with increasing filter density results in an increase in the scale multiplier displayed on readout 29. However, along with the increased scale multiplier, the amplitude shown on readout 28 is decreasing because of the increasing filter density. Thus the overall light intensity readout, taking into account both readouts 28 and 29, will remain the same for a given source of light received by the objective lens 12 of electro-optical head 10.

As filter wheel 17 includes various special filters, colorimetry, polarizing and the like, the effect of these various filters on the total scale multiplier is empirically determined. Thus no table is set forth for the contribution of binary scale encoder 54 responsive to the position of wheel 17. An empirical determination is however easily achieved by directing head 10 toward a standard light source and in succession placing filter wheel 17 in each of its filtering or light controlling positions and adjusting encoder 54 and amplitude computer 26 such that the proper light intensity is displayed on readouts 28 and 29, matching the known light intensity of the standard source.

In operation, with the various aperture and filter wheels and the range control adjusted to diverse settings, the individual outputs of encoders 51–54 are summed in adder 56 so as to issue therefrom a binary number from 0 to 13 depending upon the combination of settings. Code changer 58 receives this binary signal and serves to correlate the binary information with a proper reference scale selected in accordance with the light measurement units in which readouts 28 and 29 are to be calibrated. In this instance, a readout in units of foot-lamberts is provided. Furthermore, with each of the independent variables associated with electro-optical head 10 set at their most sensitive positions, the presently described system is designed to register on amplitude readout 28 a full scale deflection for a reference light source of $10^{-5}$ foot-lamberts. Accordingly, with the various settings in their most sensitive positions, the output of binary adder 56 will register a binary 0. Code changer 58 is designed to add a minus 5 in binary to the signal path, such that decoder 59 causes a number 5 to be registered on display 31 and a minus sign on display 32. As the aperture, filter wheels and/or range control settings are changed, a revised binary number appears at output 57 of adder 56, where this binary number is summed with the reference binary level of minus 5 in code changer 58. The resulting correlation between the output of adder 56 and the numbers displayed on scale multiplier readout 29 is set forth in following table.

CODE CHANGING AND DECODING TABLE

| ADDER 56 OUTPUT | REFERENCE LEVEL | CODE CHANGER 58 OUTPUT (sign) | | DECODER 59 OUTPUT |
| --- | --- | --- | --- | --- |
| (Binary) | (Binary) | (Binary) | | (Decimal) |
| 0 | −5 | 5 | − | 5 |
| 1 | −5 | 4 | − | 4 |
| 2 | −5 | 3 | − | 3 |
| 3 | −5 | 2 | − | 2 |
| 4 | −5 | 1 | − | 1 |
| 5 | −5 | 0 | | 0 |
| 6 | −5 | 1 | + | 1 |
| 7 | −5 | 2 | + | 2 |
| 8 | −5 | 3 | + | 3 |
| 9 | −5 | 4 | + | 4 |
| 10 | −5 | 5 | + | 5 |
| 11 | −5 | 6 | + | 6 |
| 12 | −5 | 7 | + | 7 |

Thus, for binary outputs from adder 56 of zero through five, the output of code changer 56 is a negative binary exponent starting with the reference level of minus 5, corresponding to a display on readout 29 of $10^{-5}$ foot-lamberts. The polarity of the sign developed by code changer 58 is issued over a line 61 while the binary output is fed through decoder 59 over line or output 62. In practice, code changer 58 is provided by an electronic subtracter which subtracts the output of adder 56 from a binary 5 until the output of the adder reaches 6 whereupon the adder is programed to be shifted backward by 5 starting with 1 and increasing with each unit change in the binary signal on output 57. Also code changer 58 is programed to present a sign shift from negative to positive as its output crosses zero.

Decoder 59 is a binary to decimal decoder for driving numerical display 31 which presents the numbers in a decimal format. In this manner, readout 29 generates a display indicating scale multipliers from $10^{-5}$ up through $10^{+8}$. Of course the precise range for scale multiplier 28 and the number of settings and values for aperture wheels 13, filter wheels 16 and 17 and sensitivity range control 34 may be altered as desired.

Simultaneously with the computation of the scale multiplier by computer 27, the various position encoded signals developed by encoders 21, 22, and 23 are fed to amplitude computer 26 for compensating the continuously variable output signal applied to amplitude readout 28. In particular, amplitude computer 26 is comprised of an amplifier 66 having an input 67 for receiving the electrical output of photo-sensor 11, here serially through a variable impedance 68. An output 69 of amplifier 66 is fed to amplitude readout 28, which may be provided by a panel meter for registering a continuously variable amplitude signal corresponding to the magnitude of the output signal from sensor 11. Alternatively, readout 28 may be a digital readout, or any other suitable means for displaying a continuously variable voltage or current. Associated with amplifier 66 is a network 71 of adjustable compensating impedance elements, such as trimpots, and a series of electrically operated switching means or devices for selectively connecting each of the impedance elements into the amplifier circuit in response to the aperture and filter position signals. By this arrangement, the amplifier 66 is selectively compensated, by the impedance elements so as to correct for any anomalies in the level of output signals applied to readout 28 in response to sensor 11, due to the particular settings of the aperture or filter wheels. Amplifier 66 and impedance compensation network 71 may be provided by conventional circuitry as will be recognized by those skilled in the art. For example, amplifier 66 may be an operational amplifier circuit, into which a series of variable resistance trimpots are selectively connected by transistor switches functioning in response to the outputs of encoder 21 and decoders 42 and 43. For this purpose, an output 72 of encoder 21 is extended jointly to binary scale encoder 51 of computer 27 and to impedance compensation network 71 as indicated. Similarly, outputs 46 and 47 associated with the filler wheel settings are jointly fed to computer 27 and to network 71.

In designing the electro-optical head 10, aperture wheel 13 and neutral density filter wheel 16 are constructed such that a step change in each of the settings causes approximately a factor of 10 change in the light measurement indication developed by readouts 28 and 29. Thus for aperture wheel 13 and neutral density filter wheel 16 there is theoretically no need to compensate or alter the measurement displayed by amplitude readout 28, as the change in settings should automatically be taken into account by computer 27 and scale multiplier readout 29. However, as a practical matter, it is impossible to achieve by selective sizing of the apertures of wheel 13 and selective specification of the filters on wheel 16, a precise factor of 10 change in the control of the light reaching photo-sensor 11. Thus some compensation is required to correct amplitude readout 28 for these deviations or aberration in the practical system. This is accomplished by impedance compensation network 71 as above indicated.

It is intended that impedance compensation network 71 be adjusted in the factory by trained personnel. For this purpose, standard light sources are employed, to which head 10 is directed, while the measurements indicated on readouts 28 and 29 are monitored. For each aperture and filter wheel setting, the individual trimpots of network 71 are factory adjusted to calibrate the actual readout of the system with the known light intensity of the standard source. In this regard, as suggested above in connection with the calibrating of binary scale encoder 54 in association with the filter wheel 17, the various special colorimetry and polarizing filter settings of wheel 17 may be similarly calibrated at the factory by using a standard light source and adjusting encoder 54 and the trimpots of network 71 to cause a light intensity readout in conformity with the standard.

The gain function of amplitude computer 26 is provided by variable impedance 68, which is indicated above serially connects the output of photo-sensor 11 with the input of amplifier 66. Impedance 68 is selectively changed by sensitivity control 34 to provide the desired gain function. In practice, the circuitry typically employed to achieve this variable gain function entails changing the plate resistance of a photomultiplier tube employed for photosensor 11. Thus, in the present embodiment sensitivity range control 34 is in the form of a switch in which the various gain or sensitivity positions thereof provide for connecting a different plate resistance to the photomultiplier tube. Here the settings provide for gains of 1, 10, 100 and 1000. However, the number of settings and the particular gains involved is not critical to the successful operation of the present invention. The position encoded output 36 from control 34 may be provided by separate set of contracts controlled by the same switch which changes variable impedance 68.

It is understood that the present invention has been disclosed by reference to a particular and preferred embodiment thereof and modifications and design changes may be made to the disclosed embodiment without parting from the scope of the invention.

We claim:

1. An automatic direct-reading photometer comprising:

An electro-optical means having variable aperture means, variable filter means and a light sensor issuing an electrical output signal responsive to the amount of light received by said sensor through said aperture means and filter means;

position encoding means developing electrical position signals representative of settings for said aperture and filter means;

numerical readout means; and computer means connected to said sensor and said encoding means and responsive to said sensor output signal and said position signals to develop a light measurement signal in which the sensor output, signal is compensated in accordance with the settings of said aperture and filter means, said readout means being connected to said computer means to automatically register said light measurement signal.

2. The photometer of claim 1 further defined by said readout means comprising an amplitude readout device and a scale readout device, and said computer means having an amplitude computer and a scale computer, said amplitude computer developing a compensated variable amplitude signal in response to said sensor output and position signals, said scale computer developing a scale multiplier signal in response to said position signals, said amplitude readout device connected to display said variable amplitude signal and said scale readout device connected to display said scale multiplier signal by which the amplitude signal is to be multiplied to obtain a scaled reading of said light measurement signal.

3. The photometer as set forth in claim 2 further comprising; a variable sensitivity control connected to said amplitude computer to provide for variable gain of said variable amplitude signal from said sensor, position encoding means developing an electrical position signal representative of settings for said sensitivity control, said scale computer of said computer means being connected to receive said sensitivity control position signals and developing said scale multiplier signal in response to the aperture, filter and sensitivity control position signals.

4. The automatic direct-reading photometer of claim 2, further defined by said amplitude computer including an amplifier circuit having an input operatively connected to said sensor and an output issuing said amplitude signal, a network of adjustable compensating impedance elements, and electrically operated switching means selectively connecting said impedance elements into said amplifier circuit in response to the aperture and filter position signals.

5. The photometer of claim 2 said scale computer comprising binary scale encoders responsive to the position signals developed by the aperture and filter position encoding means and issuing binary signals representing the scale multiplier contributions therefor, binary adder means connected to said scale encoders and summing outputs therefrom to total the scale multiplier contributions of said variable aperture and filter means, decoding means connected to said binary adder means and providing said scale multiplier signal for display by said scale readout device.

6. The photometer as set-forth in claim 3, said scale computer comprising a binary scale encoder for each of said variable aperture and filter means and for said sensitivity control, said binary scale encoders receiving the position signals from each of said position encoding means and developing binary signals representing the scale multiplier contribution of each, binary adder means connected to said scale encoders and summing said binary signals to provide a total scale multiplier in binary format, decoding means connecting an output of said adder means to said scale readout device.

7. A method of computing and displaying a direct numerical indication of the amount of light received by a photo-electric sensor equipped with adjustable aperture and filter assemblies, the steps comprising:

developing electrical position signals representing settings of said aperture and filter assemblies, selectively electrically compensating an output signal issued by sensor in response to said aperture and filter position signals, and developing and displaying a numerical indication of the amplitude of the compensated sensor output signal.

8. The method as defined in claim 7 further comprising, computing a scale multiplier for said compensated sensor output signal by developing electrical scale signals representing individual contributions to said scale multiplier for said aperture and filter settings, summing said electrical scale signals, and displaying a numerical representation of the sum of said scale signals as said scale multiplier.

9. The method as defined in claim 8 further comprising the steps of amplifying said sensor output signal and selectively adjusting the gain of said amplification, developing an electrical scale signal representing a contribution to said scale multiplier for said adjustable gain, and summing the gain scale signal together with the aperture and filter scale signals and displaying a numerical representation of the sum of all of said scale signals as said scale multiplier.

10. In a photometer instrument having a photoelectric sensor receiving light through selectable light control means, the improvement in combination therewith comprising: means generating electrical signals representing selected light control means; computer circuit means both automatically electrically compensating an output signal from said sensor and sutomatically electrically computing a scale multiplier for said sensor output signal in response to said electrical signals representing said selected light control means; and numerical readout menas connected to said circuit means numerically indicating the amplitude of the compensated output signal from said sensor and numerically indicating said scale multiplier therefor, whereby a direct reading numerical output of measured light is obtaned in which the selected light control means is automatically taken into account.

11. The improvement in the photometer instrument of claim 10 further comprising; a sensitivity control connected to said computer circuit means providing selectable different electrical gains for the amplitude of the compensated output signal from said sensor; means generating electrical signals representing each of the different gains provided by said sensitivity control, said computer circuit means computing said scale multiplier in response to the electrical signals representing said selectable light control means and electrical gains.

* * * * *